(12) United States Patent
Wang

(10) Patent No.: US 6,830,205 B2
(45) Date of Patent: Dec. 14, 2004

(54) ELECTRIC PEPPER MILL

(75) Inventor: Chih Hung Wang, Tainan Hsien (TW)

(73) Assignee: Duo Yeu Metal Co., Ltd., Tainan Hsien (TW)

( * ) Notice: Subject to any disclaimer, the term of this patent is extended or adjusted under 35 U.S.C. 154(b) by 155 days.

(21) Appl. No.: 10/361,765

(22) Filed: Feb. 11, 2003

(65) Prior Publication Data

US 2004/0155130 A1 Aug. 12, 2004

(51) Int. Cl.[7] .................. A01D 34/90; A47J 42/00; A47J 43/00
(52) U.S. Cl. .............. 241/169.1; 241/168; 241/258
(58) Field of Search .................. 241/168, 169.1, 241/258

(56) References Cited

U.S. PATENT DOCUMENTS 3,734,417 A * 5/1973 Russell et al. .............. 241/168
4,685,625 A * 8/1987 Mazza .......................... 241/36
4,925,150 A * 5/1990 Tedioli ...................... 241/169.1

* cited by examiner

Primary Examiner—Allen Ostrager
Assistant Examiner—Jason Y Pahng
(74) Attorney, Agent, or Firm—Rosenberg, Klein & Lee

(57) ABSTRACT

An electric pepper mill is provided with a conducting element held in position with a battery holder; the conducting element can move to an action position when the pepper mill is turned to an upright position so that it closes a circuit consisting of a motor and batteries of the pepper mill, and can move to a non-action position when the pepper mill is turned upside down so that the circuit is opened. Thus, the motor is powered by the batteries, and in turns, the pepper mill works to grind pepper when the mill is upright, and the mill stops working when it is upside down.

6 Claims, 9 Drawing Sheets

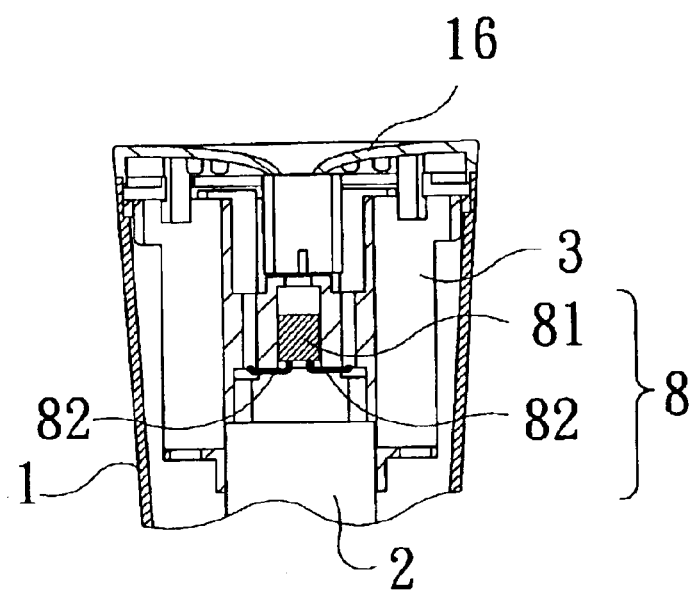
F I G. 10
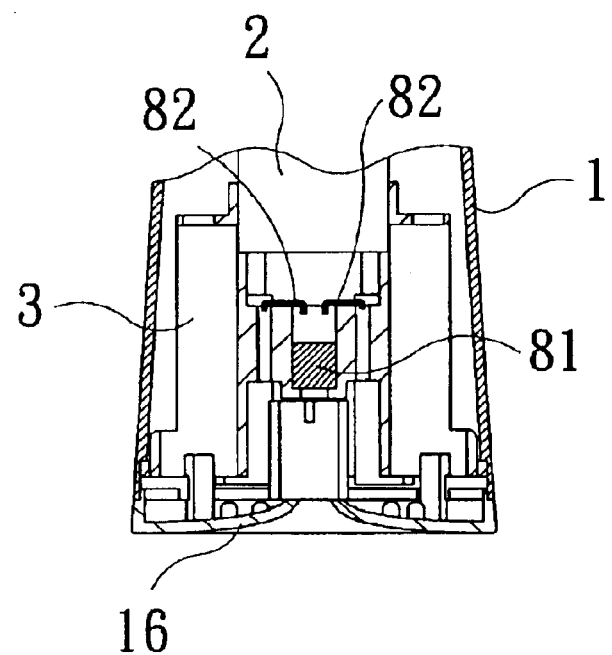
F I G. 11

ELECTRIC PEPPER MILL

BACKGROUND OF THE INVENTION

1. Field of the Invention

The present invention relates to an electric pepper mill, more particularly one, which is equipped with such a conducting element that the electric circuit thereof will be opened when the pepper mill is placed in an upside down position; thus, the pepper mill will not be powered to work in an upside down position.

2. Brief Description of the Prior Art

Electric pepper mills are very popular because they can save the users a lot of labor. Referring to FIGS. 12, and 13, a conventional pepper mill includes a main body 40, a pepper holding member 50, a power unit 60, and a grinding unit 70.

The main body 40 includes an upper cover 401, a cylindrical element 402, a transparent element 403, and a manual turning plate 405; the upper cover 401 is joined to an upper end of the cylindrical element 402 with three hooks 4011 thereof engaging corresponding trenches 4021 of the cylindrical element 402; the transparent element 403 is fitted around the cylindrical element 402; the cylindrical element 402 has a slot 4022, a protrusion 4023 sticking up form the lower end of the slot 4022; a switch 404 is up and down movably fitted to the slot 4022 with a mortise 4041 thereof being fitted over the protrusion 4023; the switch 404 is normally biased to an off position, and can be pushed down to an on position; the cylindrical element 402 is detachably joined to the manual turning plate 405 with engaging protrusions 4024 of the lower end thereof being fitted into engaging trenches of the turning plate 405, which are formed adjacent to pushed block 4051 of the turning plate 405; the cylindrical element 402 can be detached from the manual turning plate 405 when the pushed block 4051 are pushed.

A fixing chamber 406 is provided in the cylindrical element 402 while the power unit 60 has a motor holder 602 fixedly disposed in the fixing chamber 406, and a motor 601 held in the motor holder 602.

The grinding unit 70 includes a transmission shaft 701, which is connected to a central gear 702 of a gear combination joined to the shaft of the motor 601 at an upper end; the transmission shaft 701 is further screwed into an adjustment knob 703 arranged above the upper cover 401 so that fineness of ground pepper can be adjusted by means of the knob 703.

The manual turning plate 405 is joined to the upper end of the pepper holding member 50; the manual turning plate 405 is formed with stopping parts 4052, which are engaged with sloping stop protrusions 501 of the pepper holding member 50 to prevent the holding member 50 from turning together with the transmission shaft 701.

The pepper mill is not very convenient to use because the user has to keep on pressing the switch 404 in order for the pepper mill to work. If the pepper mill is equipped with such a switch instead of the one 404 that the pepper mill can continue working after the switch has been moved to the on position, the switch has to be moved back to the off position when the user wants to stop using the mill. Therefore, the pepper mill is still not very convenient to use with such switch.

SUMMARY OF THE INVENTION

It is a main object of the present invention to provide an electric pepper mill, which will not be powered to work in an upside down position.

The electric pepper mill of the present invention is equipped with a conducting element, which can move such a position as to close a circuit consisting of a motor and batteries of the pepper mill for the motor to be powered with the batteries when the pepper mill is turned to an upright position, and which can move to a non-action position when the pepper mill is turned upside down so that the circuit is opened. In other words, the motor of the pepper mill will not be powered with the batteries when the pepper mill is turned upside down.

BRIEF DESCRIPTION OF THE DRAWINGS

The present invention will be better understood by reference to the accompanying drawings, wherein:

FIG. 10 is a partial cross-sectional view of the electric pepper mill of the present invention in the upright position, FIG. 11 is a partial cross-sectional view of the electric pepper mill of the second embodiment in the upside down position.

DETAILED DESCRIPTION OF THE PREFERRED EMBODIMENTS

Figure 1:
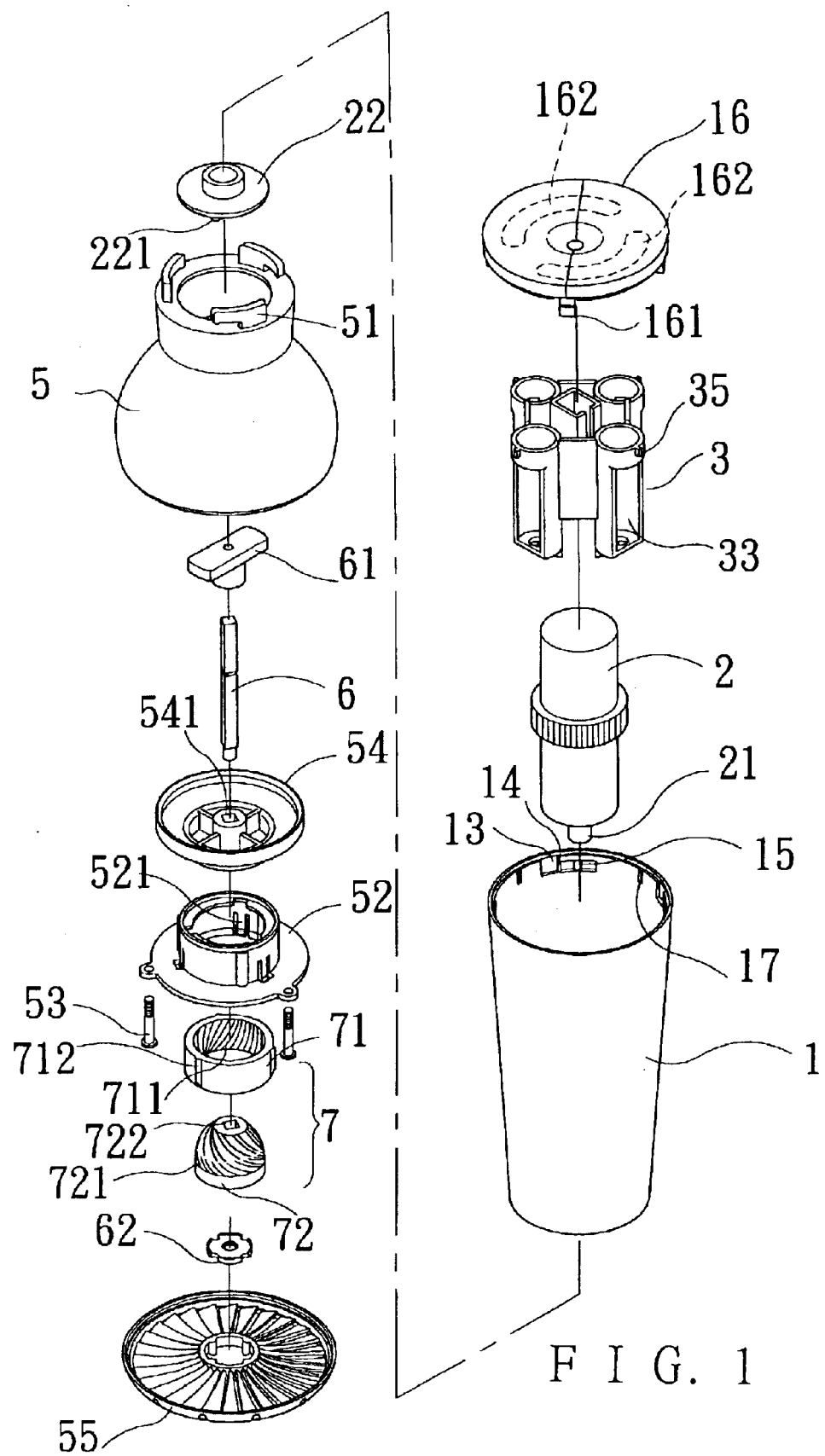
FIG. 1 is an exploded perspective view of the electric pepper mill according to the present invention.
Figure 2:
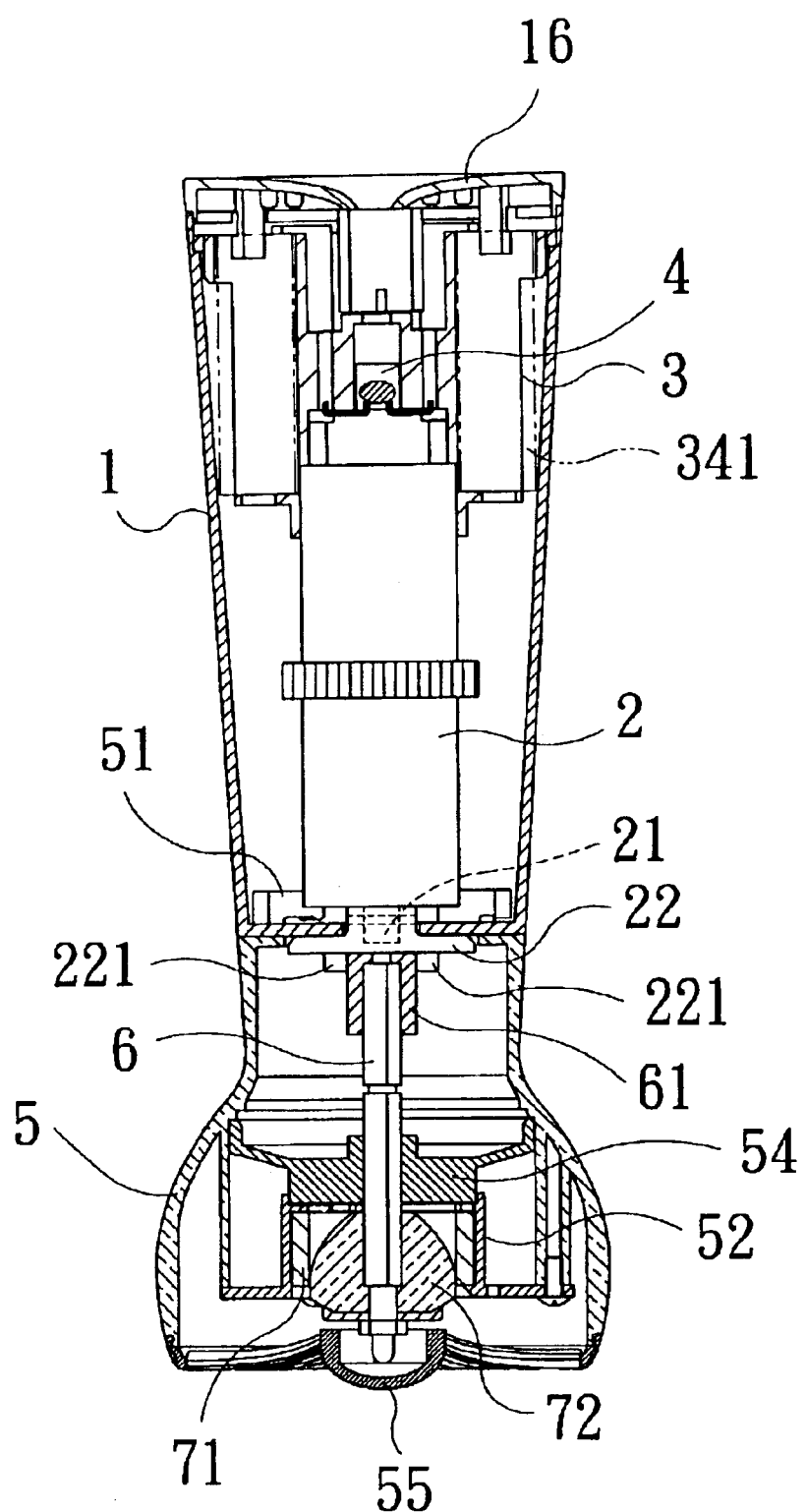
FIG. 2 is a cross-sectional view of the electric pepper mill according to the present invention.
Figure 3:
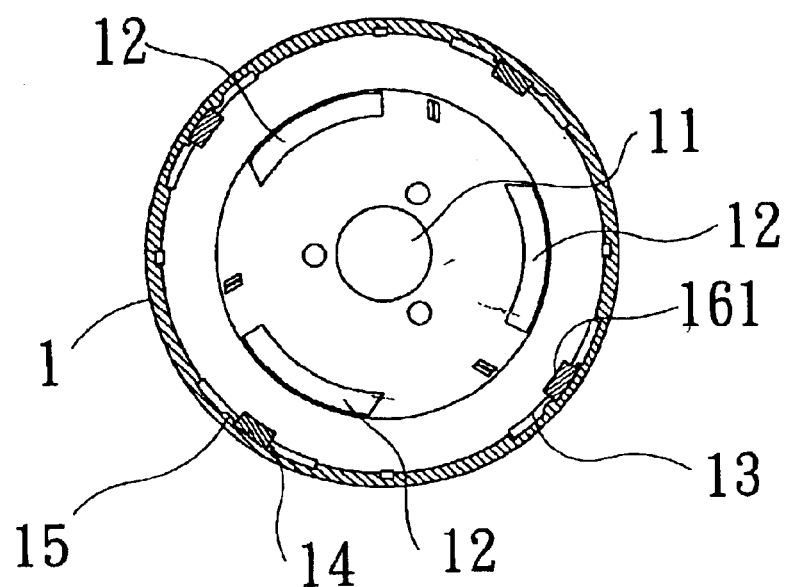
FIG. 3 is a partial cross-sectional view of the electric pepper mill of the present invention.

Referring to FIGS. 1, 2, and 3, an electric pepper mill of the present invention includes a main body 1, a motor 2, a battery holder 3, a conducting element 4, a pepper holding element 5, a transmission shaft 6, and a grinding unit 7.

The main body 1 has, as shown in FIG. 3, a through hole 11 at the center, three connecting holes 12 spaced out on the edge, several L-shaped fixing trenches 13 on an inner side of an upper end, ribs 14, 15 formed on each L-shaped fixing trench 13, and engaging trenches 17 between the L-shaped fixing trenches 13, and is joined to an upper cover 16 at the upper end thereof; the upper cover 16 has spaced hooks 161 sticking down from the edge thereof; to join the upper cover 16 to the main body 1, the hooks 161 are first fitted to bigger portions of respective fixing trenches 13, and then the upper cover 16 is turned for the hooks 161 to be fitted between the ribs 14 and 15 formed on respective fixing trenches 13. The upper cover 16 further has two curved conducting portions 162 opposite each other on the lower side.

The motor 2 is disposed in the main body 1 with a shaft 21 thereof being passed through the hole 11 of the main body 1; the shaft 21 is further connected to a transmission sleeve 22, which is positioned under the main body 1, and which has two projections 221 on a lower side.

The battery holder 3 has a central chamber 31 on a middle of a lower end thereof, four battery holding portions 33, an engaging protrusion 35 on each of the battery holding portions 33, and two opposing terminals 32, 32' beside the central chamber 31; four batteries 341 of a battery set 34 are held in respective holding portions 33; the battery holder 3 is fixedly disposed above the motor 2 in the main body 1 with the engaging protrusion 35 thereof engaging respective ones of the engaging trenches 17.

Figure 4:
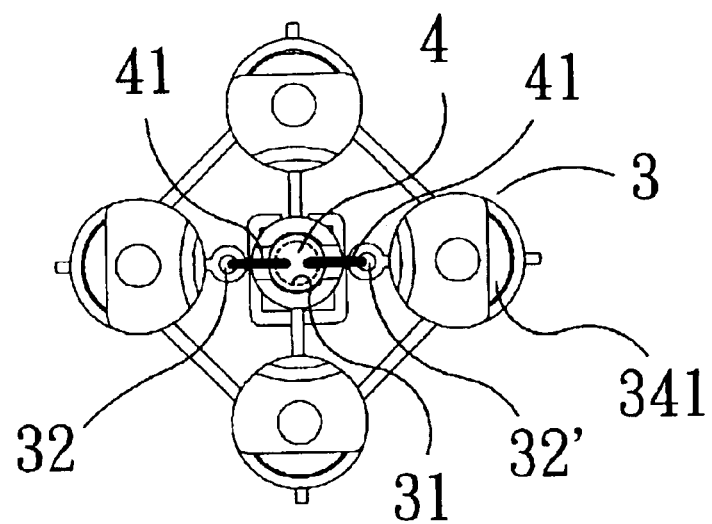
FIG. 4 is a bottom view of the conducting element and other parts of the power unit according to the present invention.
Figure 5:
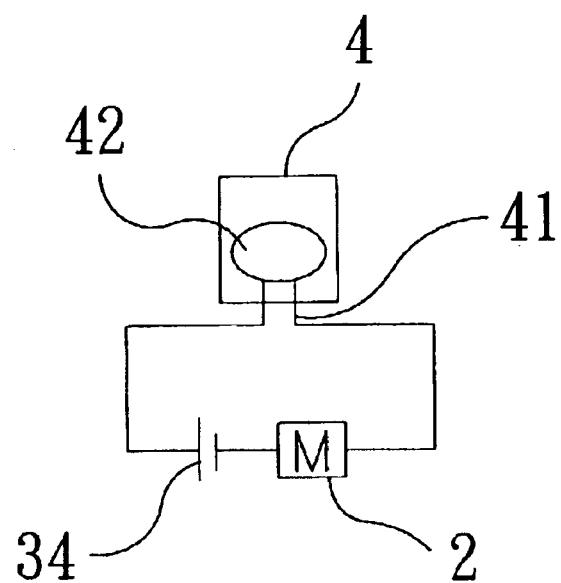
FIG. 5 is a view showing the relationship between the conducting element and other parts of the power unit of the present invention.
Figure 9:
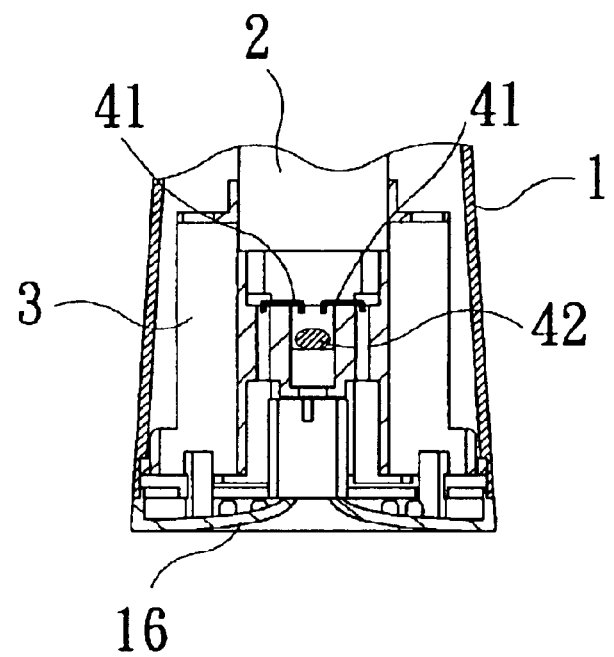
FIG. 9 is a partial cross-sectional view of the electric pepper mill of the present invention in the upside down position.
Figure 8:
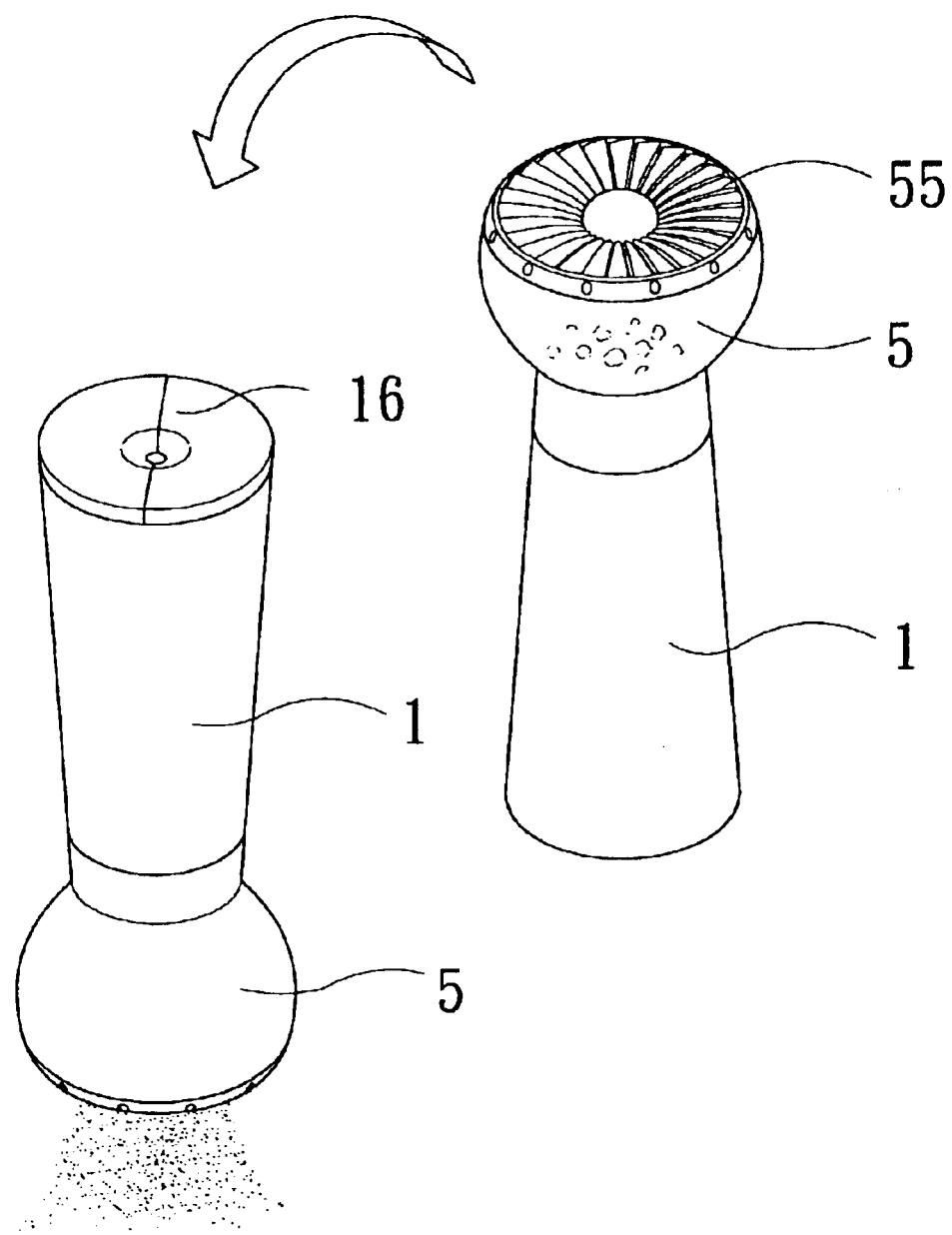
FIG. 8 is a view showing the way of using the electric pepper mill of the present invention.

Referring to FIG. 4, which is a bottom view of the battery holder 3, and FIG. 5, the conducting element 4 is held in the central chamber 31 of the battery holder 3, and has two terminal legs 41, 41, which are connected to the terminals 32, 32' respectively; the conducting element 4 further has a conductive object 42, which is movable between an action position when the pepper mill is upright, as shown in FIG. 10, where it contacts both the terminal legs 41, 41 to connect the same to each other and a non-action position when the pepper mill is upside down, as shown in FIG. 9, where it is away from the terminal legs 41, 41. In the first embodiment of the present invention, the conductive object 42 is mercury.

Figure 6:
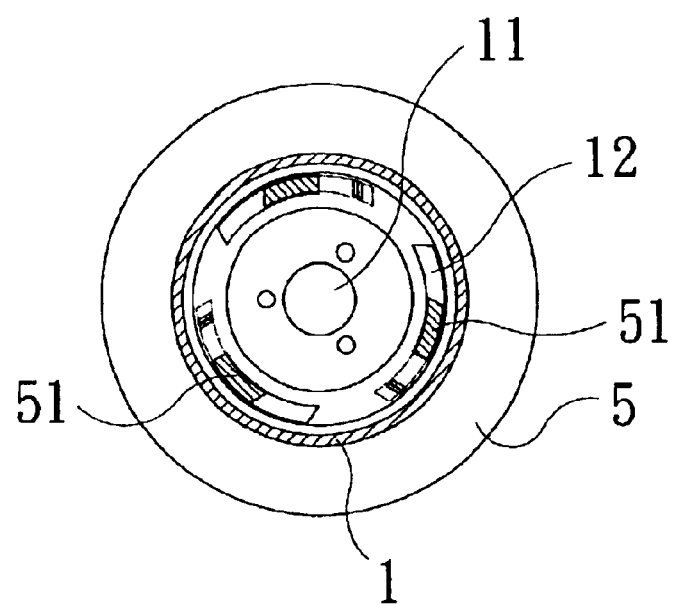
FIG. 6 is another partial cross-sectional view of the electric pepper mill of the present invention.

The pepper holding element 5 has three spaced L-shaped engaging plates 51 on the edge of the upper end, and is secured to the lower end of the main body 1 with the engaging plates 51 engaging respective connecting holes 12 as shown in FIG. 6. A fixing ring 52 is positioned in the holding element 5, and fixedly joined to the same with screws 53; a disk 54 is fixedly positioned on top of the fixing ring 52, which has a polygonal hole 541; the fixing ring 52 has elastic engaging hooks 521 spaced on the edge, and gaps (not numbered) above the hooks 521. A bottom disk 55 is fixedly joined to the lower end of the pepper holding element 5.

The transmission shaft 6 has a cross-section in the shape of the polygonal hole 541 of the disk 54, and is passed through the polygonal hole 541 and the fixing ring 52. A co-moving bar 61 is joined to the upper end of the transmission shaft 6, and engages the transmission sleeve 22 with two ends thereof being positioned between the projections 221 of the bottom of the transmission sleeve 22; thus, rotation of the shaft 21 of the motor 2 can be passed on to the transmission shaft 6.

The grinding unit 7 includes an inner grinding part 72, and an outer grinding part 71 positioned around the inner part 72. The inner part 72 has teeth 721 on the outer side, and a polygonal hole 722; the transmission shaft 6 is fitted into the polygonal hole 722 at a lower portion, and is passed into a central round hole of a locating element 62 at a round lower end. The outer part 71 has teeth 711 on the inner side thereof, and protrusions 712 spaced on the inner side. The outer part 71 is disposed in the fixing ring 52 with the protrusions 712 engaging the elastic hooks 521 as well as the gaps of the fixing ring 52 so that the outer part 71 can't move or rotate relative to the fixing ring 52. Thus, the inner part 72 can rotate relative to the outer part 71 for grinding pepper when the motor 2 is powered.

Figure 7:
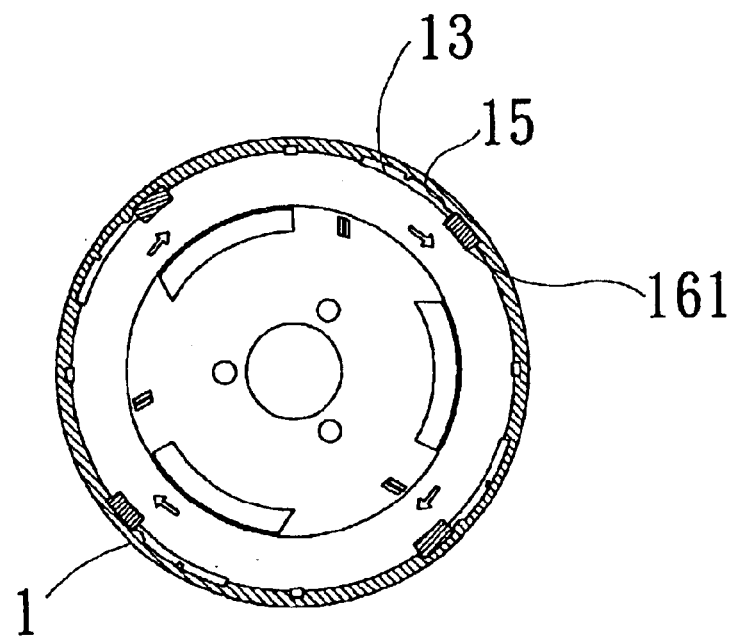
FIG. 7 is a partial cross-sectional view of the electric pepper mill of the present invention with the upper cover being turned to another position.

To separate the main body 1 from the holding element 5 for allowing peppercorns to be added into the holding element 5, the main body 1 is first turned relative to the holding element 5 for a short angle to disengage the engaging plates 51 from the fixing trenches 13. To use the pepper mill to grind pepper, first, the upper cover 16 is first turned relative to the main body 1 until the hooks 161 pass the ribs 15, as shown in FIG. 7, so that the curved conducting portions 162 of the upper cover 16 come into contact with the batteries 341 for the batteries 341 to be connected together. Then, the pepper mill is turned to an upright position where the main body 1 is above the holding element 5; thus, the conductive object 42 contacts both the terminal legs 41, 41 to connect the legs 41, 41 to each other, and in turns, the circuit is closed, and the motor 2 is powered by the batteries 341.

To stop the pepper mill, referring to FIG. 9, the pepper mill is turned to the upside-down position so that the conductive object 42 is away from the terminal legs 41, 41, and in turns, the circuit of the pepper mill is opened, and the motor 2 is no longer powered.

Figure 12:
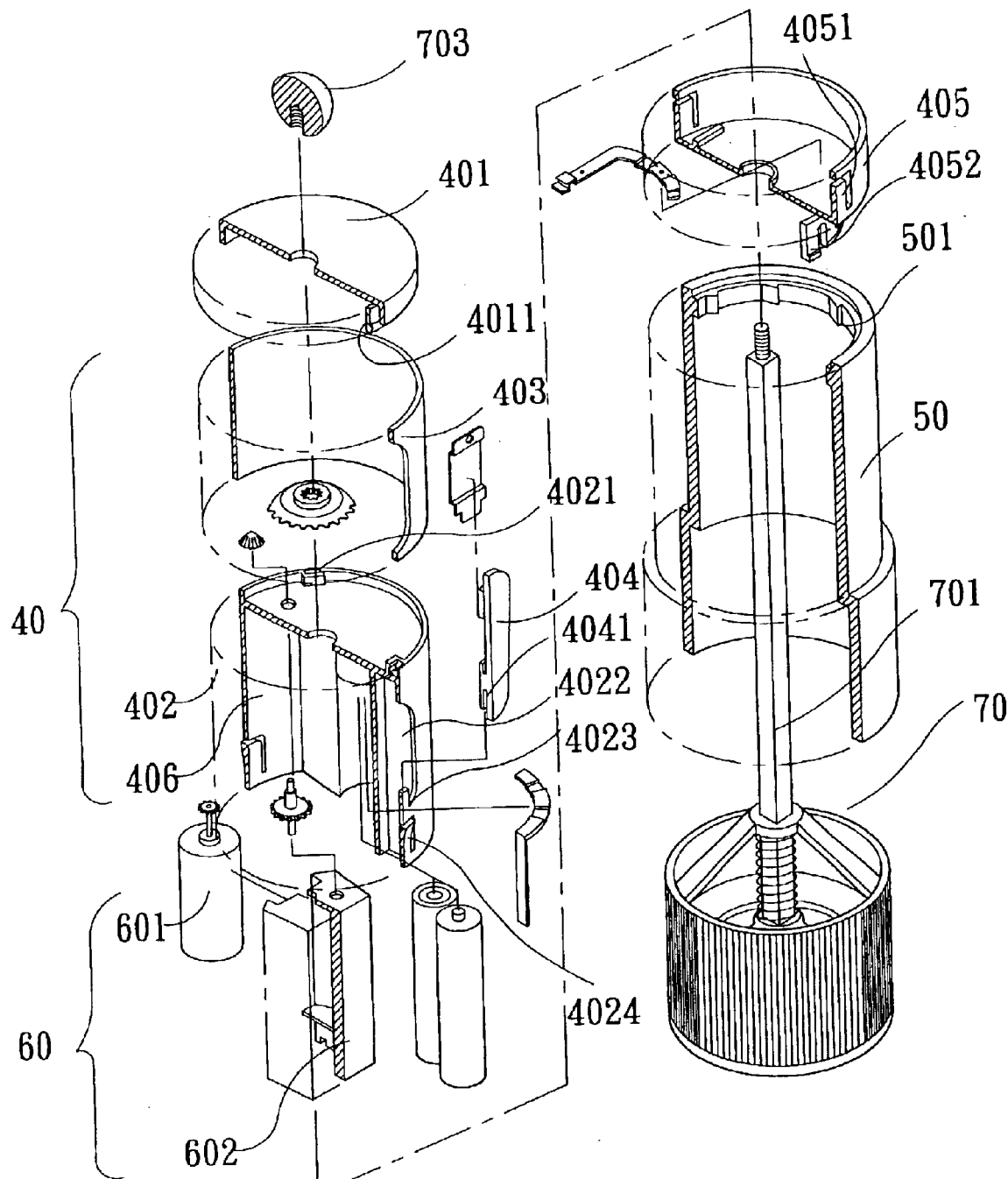
FIG. 12 is an exploded perspective view of the conventional pepper mill as described in the Background; and, FIG. 13 is a cross-sectional view of the conventional pepper mill.
Figure 13:
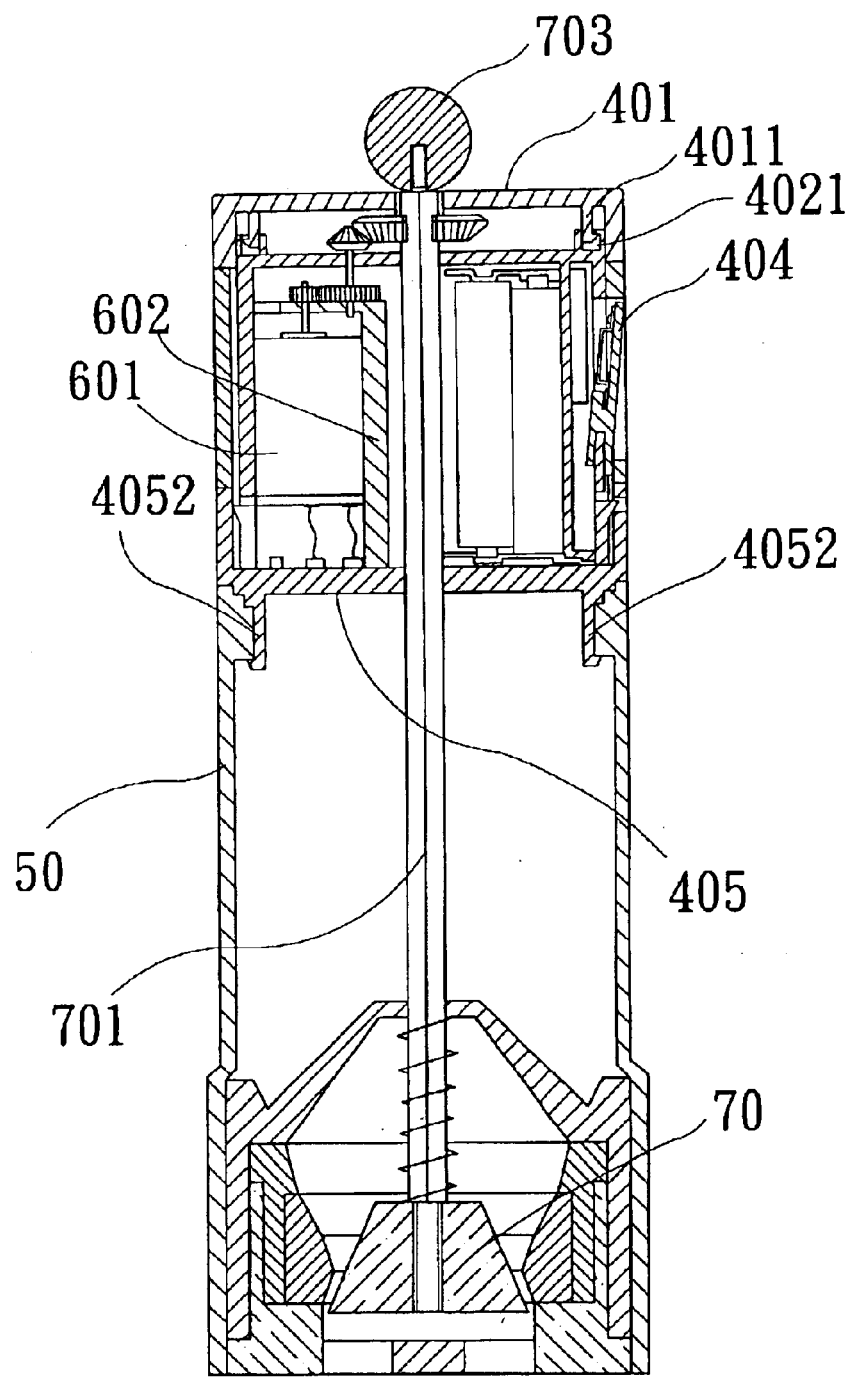

Referring to FIGS. 11, and 12, a conducting element 8 is used instead of the one 4 according to the second embodiment of the invention; the conducting element 8 includes two conducting chips 82, and a conductive metallic bar 81; the conducting chips 82 are connected to the terminals 32, 32' respectively; the conductive metallic bar 81 is movable between an action position where it closes the circuit of the pepper mill for allowing the motor 2 to be powered and a non-action position, having the same function as the mercury 42 used in the first embodiment.

From the above description, it can be easily understood that the pepper mill of the present invention is relatively convenient to use because after the upper cover 16 has been turned for the curved conducting portions 162 to come into contact with the batteries 341 to connect the batteries 341 together, the user can make the pepper mill work to grind pepper by means of turning it to the upright position, and make it stop working by means of turning it upside down. When the curved conducting portions 162 are made to no longer contact the batteries 341 by means of turning the upper cover 16, the motor 2 won't be powered with the batteries 341 no matter which positions the pepper mill is moved to.

What is claimed is:

1. An improvement on an electric pepper mill, comprising
   a hollow main body having an upper cover turnably joined to an upper end thereof;
   a motor disposed in the main body with a shaft thereof passing through a lower end of the main body;
   a battery holder disposed in the main body and holding batteries therein;
   a conducting element joined to the battery holder; the conducting element being movable between an action position when the main body is upright, wherein it closes a circuit consisting of the motor and the batteries and a non-action position when the pepper mill is upside down, wherein the circuit is opened;
   a pepper holding element detachably joined to a lower end of the main body;
   a transmission shaft disposed in the pepper holding element and turnable together with the shaft of the motor; and
   a grinding unit including an outer part fixedly disposed in the holding element, and a rotary inner part arranged in the outer part and joined to the transmission shaft for grinding pepper between the outer and the inner parts thereof;

the upper cover being capable of connecting the batteries together in a first position, and being out of electrical contact with the batteries when turned to a second position;

whereby when the upper cover is in the first position, the motor is powered by the batteries, and in turns, the pepper mill works to grind pepper when the mill is in an upright position, and the pepper stops working when it is in an upside down position.

2. The electric pepper mill as claimed in claim 1, wherein the main body has a plurality of L-shaped fixing trenches formed on an inner side of an upper end thereof, and first and second ribs formed on each L-shaped fixing trench while the upper cover has two opposing curved conducting portions formed on a lower side, and hooks projecting form an edge thereof to engage respective L-shaped fixing trenches; the curved conducting portions being out of electrical contact with the batteries by means of turning the upper cover to fit the hooks in between the first and the second ribs; the curved conducting portions are made to contact the batteries to connect same together by means of turning the upper cover so that the hooks pass the second ribs.

3. The electric pepper mill as claimed in claim 1, wherein the conducting element is disposed in a central chamber formed on a middle of a lower end of the battery holder.

4. The electric pepper mill as claimed in claim 1, wherein the conducting element includes two terminal legs, and a movable conductive object, which contacts both the terminal legs when the main body is upright, and which gets out of contact with the terminal legs when the main body is turned upside down.

5. The electric pepper mill as claimed in claim 4, wherein the conductive object is mercury.

6. The electric pepper mill as claimed in claim 4, wherein the conductive object is a conductive metallic bar.

* * * * *